Jan. 23, 1968  LA VERN E. WINN  3,364,578
ELLIPSOGRAPH FOR PANTOGRAPH
Filed Aug. 29, 1966  2 Sheets-Sheet 2

INVENTOR
LaVERN E. WINN

BY

ATTORNEYS

3,364,578

ELLIPSOGRAPH FOR PANTOGRAPH
La Vern E. Winn, Hampton, Va., assignor to the United States of America as represented by the Administrator of the National Aeronautics and Space Administration
Filed Aug. 29, 1966, Ser. No. 576,195
3 Claims. (Cl. 33—31)

The invention described herein was made by an employee of the United States Government and may be manufactured and used by or for the Government for governmental purposes without the payment of any royalties thereon or therefor.

This invention relates generally to apparatus for describing an ellipse and more particularly to an ellipsograph permitting description of ellipses having minimal axial dimensions.

Various methods have been utilized previously for drawing ellipses. However, these devices generally required the use of complicated sets of charts or directions for computations in utilization of the apparatus or were unable to describe ellipses having minimal dimensions. This latter characteristic is critical when it is necessary to describe ellipses having relatively small axes because the guides are unable to closely approach one another and thereby establish a minimum size for the elliptical axes. Minimal axes dimensions are extremely critical in various utilizations, such for example as in defining the elliptical templates of a small scale model.

In order to overcome the disadvantages of the prior art, the instant invention contemplates the use of a pair of vertically spaced, substantially perpendicular tracks in which shoes adjustably mounted on a tracer beam disposed between the tracks that is permitted rotation to define ellipses of infinitely small axes.

It is an object of the instant invention to provide a novel ellipse describing apparatus that is capable of defining ellipses having minimal axial dimensions.

It is another object of this invention to provide an ellipsograph that is of simple operation and readily dismantled for storage.

A further object of the present invention is to provide a novel ellipsograph for utilization with a pantograph cutter apparatus to permit cutting of ellipses from various materials.

Still another object of the instant invention is to provide an ellipsograph in which vertically spaced tracks are arranged substantially perpendicular to one another with a tracer beam disposed between the tracks and interconnected thereto by shoes fitting and sliding within the tracks.

Generally, the foregoing and other objects are accomplished by utilization of a mounting assembly to which is affixed a pair of tracks that are disposed substantially at right angles to one another and into which shoes are slidably interconnected with a tracer beam disposed between the two tracks. The tracer beam is capable of connection with a pantograph cutter to provide an ellipse cutting apparatus or the tracer bar may be utilized for drawing ellipses having relatively large to infinitely minimal axial dimensions.

A more complete appreciation of the invention and many of the attendant advantages thereof will be readily apparent as the same become better understood by reference to the following drawings wherein.

Figure 1:
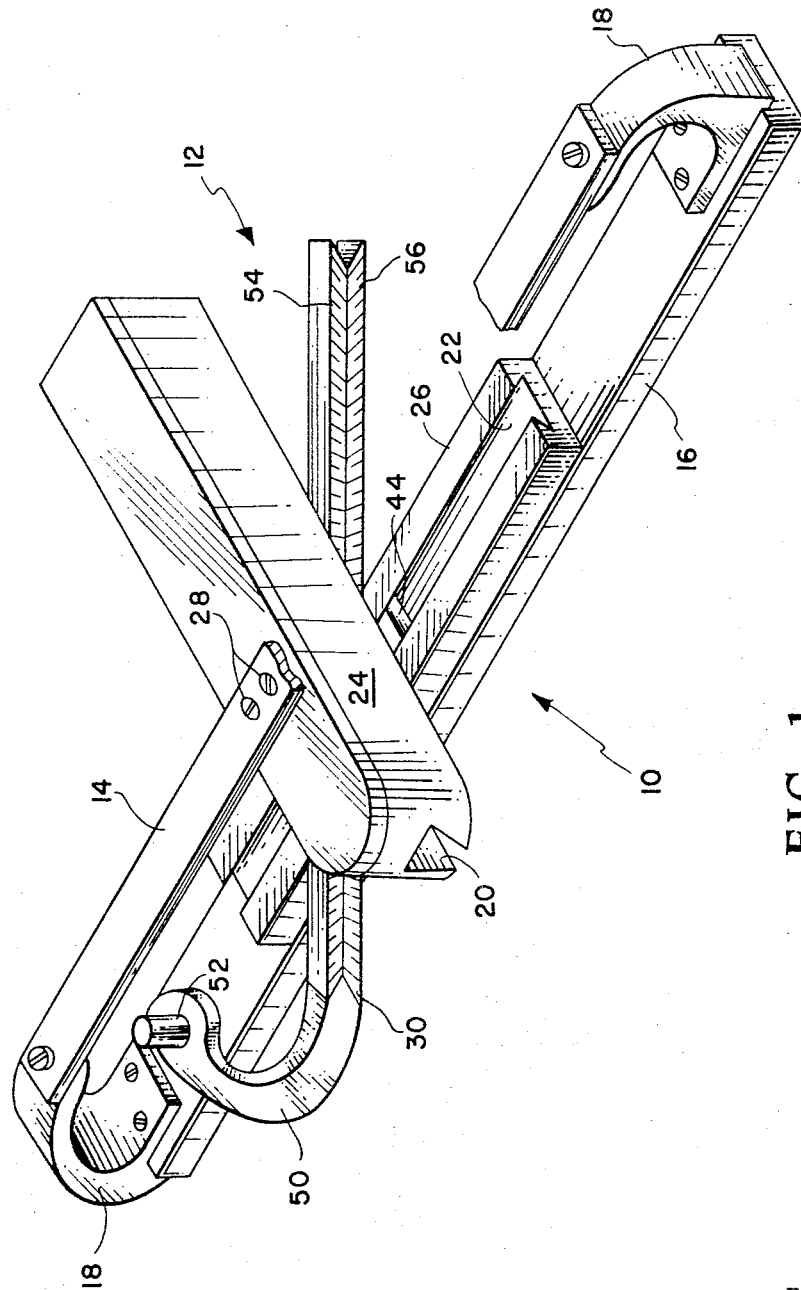
FIG. 1 is a diagrammatic perspective view of the major component relationships of the instant invention.
Figure 2:
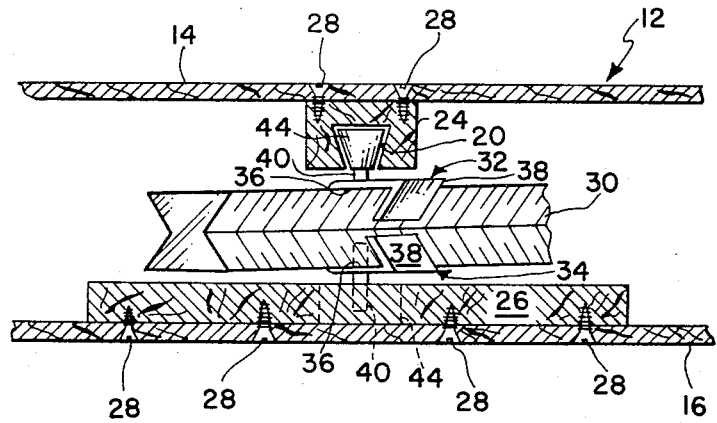
FIG. 2 is a front elevational view of the instant invention.

Referring now to the drawings and more particularly to FIGS. 1 and 2 wherein mounting assembly 12 is shown as having top frame member 14 and bottom frame member 16 connected by end frame members 18. Thus, mounting assembly 12 generally forms an elongated oval configuration with track members 24 and 26 respectively attached to frame members 14 and 16. Track members 24 and 26 are shown as having dovetail grooves or tracks 20 and 22, respectively. Although the grooves are shown to be of dovetail configuration, it is readily apparent that any conventional type of track member could be utilized as will be described more fully hereinafter. Screws 28 are utilized for mounting track members 24 and 26 on frame members 14 and 16.

As shown in FIGS. 1 and 2, track members 24 and 26 are at substantially right angles to one another and vertically spaced to provide for tracer beam 30 which is disposed between the two track members. Top clamp 32 and bottom clamp 34 are mounted on tracer beam 30 which could be of hexagonal shape as shown in order to more readily and accurately accommodate clamp members 32 and 34. Clamps 32 and 34 each include base 36 and sides 38 which would most effectively correspond to a section of the configuration of tracer beam 30. Pin 40 extends base 36 as will be described more fully hereinafter. Set-screws 42 mounted on a side 38 of each of clamps 32 and 34 permit accurate and rigid attachment of the clamps to tracer beam 30.

Figure 3:
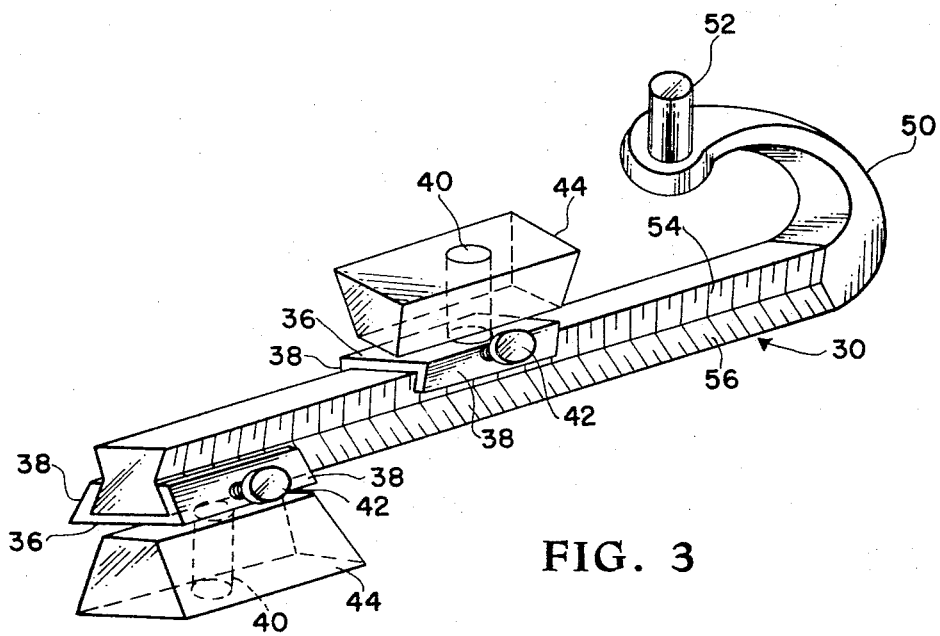
FIG. 3 is an enlarged perspective view of a portion of the invention shown in FIGS. 1 and 2.

Pin 40 may be rigidly attached to base 36 and extend generally vertically therefrom for rotatable attachment to sliding shoes 44. Although pin 40 is described herein as rigidly secured to base 36 and rotatably attached to shoe 44, it is to be understood that the reverse construction could also be utilized. Furthermore, it is obvious that pin 40 could be rotatably attached to both base 36 and shoe 44. As shown in FIGS. 2 and 3 shoes 44 are of generally trapezoidal configuration for a mating and sliding engagement with dovetail tracks 20 and 22.

In order to adapt the instant inventive ellipsograph 10 for utilization with a pantograph that would cut ellipses from various materials, beam extension 50 is attached to tracer beam 30 at one end thereof and has pin 52 mounted on extension 50 to provide a positive and rotatable connection with the pantograph apparatus. It is to be understood, however, that the instant invention could well include an attachment (not shown) for tracer beam 30 that would mark or draw the desired elliptical configuration.

To provide for rapid setting of the major axis dimension, tracer beam 30 has scale 54 marked thereon. Scale 56 on tracer beam 30 provides for rapid setting of the minor axis dimension of the desired ellipse. Although scales 54 and 56 are shown in FIG. 3 to be on the side of tracer beam 30, it is to be understood that the scales could be located as desired with provision being made for rapid and accurate setting of clamps 32 and 34.

In operation ellipsograph 10 provides for track members 24 and 26 to be substantially perpendicular as hereinabove described and tracer beam 30 disposed therebetween with shoes 44 mounted for sliding engagement in tracks 20 and 22. If the ellipse to be described is to be cut from a piece of material, beam extension 50 and pin 52 would be appropriately attached to beam 30 and the pantograph apparatus. Obviously, shoe members 44 are of a configuration that would easily fit within grooves 20 and 22 and provide substantially frictionless movement therein while retaining a minimum of clearance or undesirable lateral movement. With ellipsograph 10 properly mounted and assembled, it is necessary only to adjust clamps 32 and 34 on tracer beam 30. As noted hereinabove the adjustment is accomplished by locating clamp 32 on scale 54 in accordance with the major axis of the desired ellipse and utilizing setscrew 42 for rigid securement of clamp 32 to beam 30. Clamp 34 would be adjusted on scale 56 to the minor axis of the desired ellipse and setscrew 42 on clamp 34 utilized for rigidly securing clamp 34 to tracer beam 30. In order to describe the desired ellipse it is then merely necessary to rotate tracer beam 30 about itself and any given point, for example the center of pin 52, will describe the desired ellipse. It is readily apparent that the instant ellipsograph assembly permits the pivot points at the center of pins 40 to be in alinement and thus permits the description of infinitesimally small, as well as relatively large, ellipses.

The above description of the operation of the instant invention is just one specific example to give a clear indication of the simple and reliable ellipsograph device. It is readily apparent that ellipses of any major or minor axis may be readily described by a simple adjustment in the location of clamps 32 and 34. The inventive apparatus permits rapid assembly and disassembly that can be accomplished with a minimum of effort and requiring a minimum of storage area. It is also a characteristic of the present invention that it is readily adaptable to construction from any of many materials, such for example as wood, metal or plastics.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A device for guiding the cutter of a pantograph apparatus in an elliptical path comprising:

vertically spaced elongated track means extending substantially at right angles;

linear beam means disposed between said track means;

a plurality of shoe means of a configuration for engagement with each of said track means;

a plurality of connection means having a first means drivingly connected to each of said shoe means and a second means drivingly connected to the first means and movably engaging said beam means along its length; and securing means operatively associated with each second means providing selective fixing of each second means to said beam means at points of engagement;

said beam means having spaced track portions, each of said second means being spaced from each other on the track portions allowing said second means to pass each other, said beam means having means thereon for engagement with the pantograph apparatus;

whereby said device is adjustable to describe ellipses of infinitesimally small dimensions.

2. The ellipsograph of claim 1 wherein said second means comprise a clamp member and said securing means is a setscrew adjustably and rigidly securing said clamp to said beam means; and said first means is a pin drivingly connected to said shoe means and said clamp member.

3. The ellipsograph of claim 2 including scale means mounted on said beam means to provide for rapid adjustment of said clamps.

References Cited

UNITED STATES PATENTS

| | | | |
|---|---|---|---|
| 246,174 | 8/1881 | McComb | 33—31 |
| 905,107 | 11/1908 | Schrieber | 33—31 |
| 2,039,584 | 5/1936 | Dixon | 33—31 |
| 2,409,290 | 10/1946 | Lipp | 33—26 |
| 3,177,586 | 4/1965 | Arno | 33—27 |

FOREIGN PATENTS

| | | |
|---|---|---|
| 167,407 | 1/1951 | Austria. |
| 318,024 | 8/1929 | Great Britain. |
| 590,749 | 7/1947 | Great Britain. |
| 266,659 | 5/1950 | Switzerland. |

HARRY N. HAROIAN, *Primary Examiner.*

LEONARD FORMAN, *Examiner.*